Figure 1:
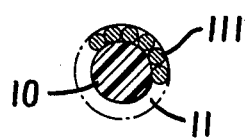

United States Patent [19]
Boileau

[11] 3,977,174
[45] Aug. 31, 1976

[54] CABLE FOR REINFORCING OBJECTS FORMED OF ELASTIC OR EASILY DEFORMABLE MATERIALS

[75] Inventor: Jacques Boileau, Clermont-Ferrand, France

[73] Assignee: Compagnie Generale des Etablissements Michelin, raison sociale Michelin & Cie, France

[22] Filed: Feb. 11, 1975

[21] Appl. No.: 549,064

[30] Foreign Application Priority Data
Feb. 12, 1974 France .................. 74.04790

[52] U.S. Cl. ........................... 57/145
[51] Int. Cl.[2] .................. D02G 3/48; D07B 1/10
[58] Field of Search ............. 57/139, 144, 145, 146, 57/147, 148, 152

[56] References Cited
UNITED STATES PATENTS

| | | | |
|---|---|---|---|
| 2,138,420 | 11/1938 | Glasser | 57/145 |
| 2,799,149 | 1/1957 | Schuller | 57/148 |
| 3,032,963 | 5/1962 | Fenner | 57/145 |
| 3,075,344 | 1/1963 | Fenner et al. | 57/147 |
| 3,352,098 | 11/1967 | Gilmore | 57/147 |
| 3,686,855 | 8/1972 | Falcy | 57/145 |
| 3,762,145 | 10/1973 | Kikuchi et al. | 57/145 |
| 3,778,993 | 12/1973 | Glushko et al. | 57/145 |
| 3,834,149 | 9/1974 | Nisbet | 57/145 |

*Primary Examiner*—Donald E. Watkins
*Attorney, Agent, or Firm*—Brumbaugh, Graves, Donohue & Raymond

[57] ABSTRACT

A cable for reinforcing objects formed of elastic or easily deformable material, such as automobile tires and conveyor belts, has as conventional components a core and at least one peripheral layer surrounding the core, each component being formed of elements, such as individual wires or strands of wires. The resistance of such a reinforcing cable to fatigue and/or to wear is increased due to the fact that at least two consecutive components in contact with each other in radial direction are constituted of elements made of material having moduli of elasticity which differ from one component to the other.

8 Claims, 4 Drawing Figures

CABLE FOR REINFORCING OBJECTS FORMED OF ELASTIC OR EASILY DEFORMABLE MATERIALS

The present invention relates to improvements in objects formed of elastic or easily deformable solid material (rubber, plastic, etc.) arranged around a reinforcement having a higher instantaneous elastic constant than the said material does.

The invention relates more particularly to the constituents of said reinforcement. These constituents, customarily known as cables or cords will be designated, in order to simplify but not to limit the following description, by the generic expression "cables."

Customarily a cable comprises, going from its inside to its outside, the following components: a core and, arranged concentrically around the core, at least one peripheral layer. These components of a cable are formed of elements which may be either individual wires or strands, a strand resulting from the assembling of at least two individual wires.

The cables are imbedded in the material which is to be reinforced. They adhere to said material and deform with it. In this way the cables limit the deformations of the material in order to avoid the breaking thereof. However, particularly in automobile tires, conveyor belts, pneumatic springs or certain tubes, the cables suffer in prolonged manner substantial, complex and rapidly varying stresses as well as chemical and/or biological attack. This may result in a failure of the cables which precedes the failure of the materials to be reinforced. The principal causes of such failure are the fatigue and/or wear of the elements (wires or strands) forming the components of the cables.

Therefore, the principal object of the present invention is to provide cable structures which increase the resistance of the cables to fatigue and/or to wear. This, of course, without harming the endurance of the bond between the cables and the materials to be reinforced or even improving the endurance of said bond.

Another object of the present invention is to provide cable structures of improved endurance, these cables being capable both of more easily following along in the deformations of the material which surrounds them and of pushing the elongation upon rupture of said material to beyond its customary limit.

Another object of the present invention is also to provide cable structures whose elasticity can be predicted in advance and can therefore be easily adapted to that of the materials to be reinforced.

The research carried out by the applicant has shown that the above indicated drawbacks are due to deformations of the cables perpendicular to their axis. More particularly, these drawbacks are in major part due to the radial stresses which the components of the cables exert on each other or on the core. The conventional theory of cables, as a matter of fact, neglects these radial stresses because ordinary cables, for instance those serving for handling operations, operate under much simpler and better known conditions than the reinforcement cables contemplated by the present invention.

Moreover, it has actually been attempted to manufacture reinforcement cables the components of which are apparently free of radial pressures.

Such cables are described in French Pat. No. 1,118,486 of Michelin. They are relatively elastic cables assembled from metallic elements intentionally spaced apart from each other. Actually their properties are retained only in the case of small stresses, that is to say as long as the components are not in contact.

Other known cables have metal elements twisted with a very short pitch around an excessively deformable core. Due to their very special structure, these cables operate more like coil springs. Furthermore, their manufacture is difficult.

The principle forming the basis of the present invention consists essentially in attenuating the radial pressures exerted by the different component layers of the cable on each other or on the core. In other words, the invention is directed at reducing the radial contact pressures between the elements of one component and the elements of the adjacent component or components.

Accordingly, the cables in accordance with the invention which have as their components a core and at least one peripheral layer surrounding said core, each component being formed of elements, are characterized by the fact that at least two consecutive components in contact with each other in radial direction are constituted of elements made of materials having moduli of elasticity which differ from one component to the other.

The modulus of elasticity of an element is by definition the customary modulus of the material from which it is manufactured, measured in accordance with the standards in force for the different materials capable of forming the elements entering into the constitution of the components of the cables in accordance with the invention. These materials themselves are all materials capable of constituting wires of a given length, such as for instance metals, metal alloys or synthetic materials, whatever their structure, their chemical composition, or their process of production. This description of the materials which can be used in the invention is of course merely enumerative and in no way limitative and extends both to known materials and to materials still to be discovered, provided that the fundamental principle of the invention is respected.

From the application of this principle, it results that the surfaces of contact between the elements constituting one component in contact with the elements constituting the component which is immediately adjacent it, may be increased and the contact pressures therefore decreased. Elements spaced apart circumferentially from each other are preferably used in one or more components so that there is contact in radial direction only between successive components and little or no contact between the elements forming the said components. If, on the other hand, it is desired to manufacture cables in accordance with the invention which adhere well to the material of which they form the reinforcement, a high number of adjoining elements of relatively small diameter is preferably used for the component of the cable in contact with the said material, that is to say for the peripheral layer of the cable. However, the basic principle of the invention does not exclude the use in one and the same component of elements which differ from each other by materials of different moduli of elasticity. For example, an element of brass or even of plastic can be interposed between two elements of steel.

In certain applications, it has been found advantageous to use for the elements of the components of the cables materials such that said elements undergo only small or practically no permanent deformations. These deformations may come from physical stresses (pressure, temperature, etc.) to which the cables are subjected upon manufacture or from the use of the objects whose reinforcement is formed of these cables. Contrary to the opinion generally held, such deformations, although they increase the surfaces of contact between the elements of the cable, are capable of reducing the rigidity of the cable, particularly in the event that said rigidity can be accessible to calculation.

A simple example in accordance with the invention consists in assembling a cable by means of a core of modulus $E_0$ and a peripheral layer formed of unitary wires of modulus $E_1$. In accordance with the invention, $E_0$ is different from $E_1$. In the particular case in which $E_0$ is less than $E_1$ one can obtain an elastic cable whose rigidity E (rigidity being defined as the ratio of the force to the elongation produced by said force) can be calculated by means of the following relationship:

$$E = A_0 \cdot \frac{1 - A_1 \tan^2\alpha}{1 + A_2 \sin^2\alpha + A_3 \sin^4\alpha} \qquad (1)$$

In this relationship, $\alpha$ is the angle of twist of the wires with respect to the axis of the cable and the quantities $A_0, A_1, A_2, A_3$ are functions of the geometrical characteristics of the cable and of the mechanical characteristics of the materials used. In particular:

$$A_0 = n\, S_1 \cdot E_1 \cdot \cos^3\alpha + E_0\, S_0$$

$n$ is equal to the number of wires used in the peripheral layer, $S_1$ is the cross section of a wire, $S_0$ is the cross section of the core.

It should be pointed out that $A_0$ is that rigidity in the manner in which it is customarily calculated. As the terms $A_1, A_2, A_3$ are positive, it is obvious that the rigidity E of the cable is less than $A_0$, which is the rigidity as customarily calculated. As the term $A_3$ is an increasing linear function of the ratio $E_1$ to $E_0$ the relationship (1) shows that one can obtain a low rigidity E even with a large angle $\alpha$. As the tension of the wires is inversely proportional to cos $\alpha$, one thus obtains a cable of low rigidity which also has low stresses in the wires, while customarily this low rigidity obtained with a short cabling pitch (large $\alpha$) will give large stresses in the wires, which is harmful to the endurance of the cable.

In the event that one desires a very elastic cable one will use a core of low modulus $E_0$ as compared with $E_1$ and one can write:

$$A_0 = n\, S_1\, E_1 \cos^3\alpha$$

Relationship (1) simplified in this manner makes it possible to calculate the rigidity of the cable with an approximation of the order of 10%. Thus for instance with a core formed of a monofilament of polyamide of a radius of 0.40 mm surrounded by a layer of eleven steel wires of a radius of 0.13 mm, one can easily produce cables having rigidities of between 10,000 and 3,000 daN by suitably selecting the angle of twist $\alpha$, that is to say the cabling pitch of the steel wires.

The rigidity of 3,000 daN is obtained with an angle of twist of 30°. If one had constructed a conventional cable having the same rigidity, the angle of twist would be greater than 50°.

Therefore, the tension in the wires of the conventional cable would be 35% greater than the tension in the wires of the cable in accordance with the invention.

One can also for instance produce a cable consisting of ten steel wires of a radius of 0.13 mm assembled on a monofilament core of polyamide of 0.35 mm in radius and of a modulus equal to 100 daN/mm². This cable may have a previously calculated rigidity of between 3500 and 8500 daN.

By means of a monofilament core of polyamide of 0.1 mm radius and 150 daN/mm² modulus surrounded by five steel wires of 0.13 mm radius, one can also produce a cable of a rigidity of between 4000 and 5200 daN.

In these last two examples, the gain in tension on the wires as compared with the ordinary cables is of the order of magnitude cited above. This increase is greater the more one seeks very elastic cables, that is to say cables of low rigidity.

In this way, it is possible to manufacture cables of rigidities of between 0.2 to 0.8 of the rigidity of the elements surrounding the core. Moreover, this type of construction makes it possible to obtain cables whose rigidity remains low until rupture and therefore to obtain cables whose elongation upon rupture is high.

It is also possible in accordance with the invention to produce cables comprising a plurality of components in addition to the core, for instance by means of two layers of unitary wires of material of modulus $E_1$ for the layer arranged immediately over the core and material of modulus $E_2$ for the peripheral layer, the core being of a material of modulus $E_0$. In accordance with the invention, the modulus $E_0$ must be different at least from the modulus $E_1$. With regard to the moduli $E_1$ and $E_2$, two cases may arise. If the forces of contact between the two layers of unitary wires are not harmful to the endurance of the cable, the moduli $E_1$ and $E_2$ may be selected of the same value. On the other hand, if the forces of contact between these two layers are too high, it is advisable to select the modulus $E_1$ different from the modulus $E_2$ in accordance with the invention. This does not prevent the modulus $E_2$ is this latter case from being equal to the modulus $E_0$ in accordance with the basic principle of the invention.

In the first case the modulus $E_0$ is preferably selected less than $E_1$ and in the second case the modulus $E_1$ is preferably selected less than the moduli $E_0$ and $E_2$.

Without going beyond the scope of the invention, strands can be used in place and stead of the wires for the manufacture of the cables. One can produce strands which themselves have a smaller rigidity than the rigidity of their constituent elements. In these circumstances, everything is as though one used an equivalent material of smaller modulus. One can thus obtain cables having an even lesser rigidity.

The invention will be readily understood by means of the drawing and the description thereof which follow, which illustrate a number of other nonlimitative embodiments of the invention.

FIGS. 1 to 4 are sections through cables in accordance with the invention. To simplify matters, only a few wires forming the layer or layers on the periphery of the core of the cables have been shown.

FIG. 1 shows a cable comprising a monofilament core 10, consisting, for instance, of a single wire of plastic material, or of a textile cable, and a single peripheral layer 11 of steel wires or strands 111. The core 10 has a modulus $E_0$ while the wires and/or the strands 111 have a modulus $E_1$.

Figure 2:
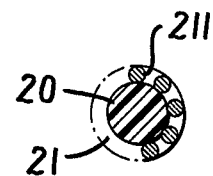

FIG. 2 illustrates the same cable as FIG. 1, except that the elements 211 of the peripheral layer 21 are spaced apart from each other.

Figure 3:
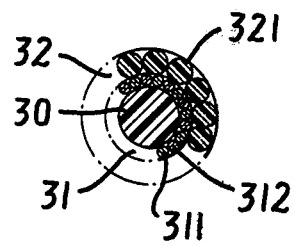

FIG. 3 shows a three-component cable in accordance with the invention having a monofilament core 30, a first layer 31 in which adjoining wires 311, 312 of modulus $E_1$ and $E'_1$ alternate. Modulus $E_1$ is different from modulus $E'_1$. Furthermore, the moduli $E_1$ and $E'_1$ are different from the moduli $E_0$ and $E_2$.

Figure 4:
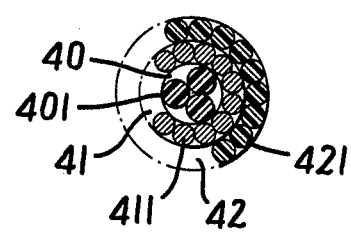

FIG. 4 also shows a cable in accordance with the invention comprising the three following components: a core 40 formed of three twisted wires 401 of modulus $E_0$, a first layer 41 of adjoining wires 411 of modulus $E_1$, and a second layer 42 of adjoining wires 421 of modulus $E_2$, the modulus $E_1$ being different from the moduli $E_0$ and $E_2$.

In the cables shown in FIGS. 3 and 4, the moduli $E_0$ and $E_2$ may of course be equal.

What is claimed is:

1. A cable for reinforcing a tire, having as components a metallic core free of peripheral ridges thereon and at least one peripheral layer surrounding said metallic core, each component being formed of elements, characterized by the fact that at least two consecutive components in contact with each other in radial direction are constituted of elements made of materials having moduli of elasticity which differ from one component to the other, whereby the radial contact pressures between the elements of one component and the elements of the adjacent component are reduced.

2. The cable as defined by claim 1 wherein the elements forming at least one of the components are made of materials of different moduli of elasticity.

3. The cable as defined by claim 1 wherein the elements forming at least one of the components are spaced apart circumferentially from each other.

4. The cable as defined by claim 1 wherein the component intended to be in contact with the tire to be reinforced is formed of elements of a relatively small diameter arranged adjoining each other.

5. The cable as defined by claim 1 wherein the metallic core is formed of one or more elements of a modulus of elasticity less than the modulus of elasticity of the elements of the component surrounding the metallic core, said cable being formed of these two components only.

6. The cable as defined by claim 5 wherein the rigidity of the cable is between 0.2 and 0.8 of the rigidity of the elements surrounding the core.

7. The cable as defined by claim 1 wherein the rigidity E of the cable is given by the formula:

$$E = A_0 \cdot \frac{1 - A_1 \tan^2\alpha}{1 + A_2 \sin^2\alpha + A_3 \sin^4\alpha}$$

in which the parameters $A_0$, $A_1$, $A_2$, $A_3$ and $\alpha$ correspond to the definitions given thereof in the foregoing specification.

8. The cable as defined by claim 1 wherein the elements constituting the components of the cable are made of materials which undergo small or practically no permanent deformations under the effect of the physical stresses to which the cable is subjected upon the manufacture or use of the tire in which it serves as reinforcement.

* * * * *